United States Patent
Martin et al.

(10) Patent No.: US 7,494,171 B2
(45) Date of Patent: Feb. 24, 2009

(54) TRUCKBED TOOLBOX

(76) Inventors: Todd E. Martin, 7506 22nd Ave., Kenosha, WI (US) 53142; Kerry E. Martin, 7506 22nd Ave., Kenosha, WI (US) 53142

( * ) Notice: Subject to any disclaimer, the term of this patent is extended or adjusted under 35 U.S.C. 154(b) by 0 days.

(21) Appl. No.: 11/595,509

(22) Filed: Nov. 10, 2006

(65) Prior Publication Data

US 2007/0108786 A1 May 17, 2007

Related U.S. Application Data

(60) Provisional application No. 60/736,512, filed on Nov. 14, 2005.

(51) Int. Cl.
*B60R 9/06* (2006.01)
(52) U.S. Cl. .......... 296/37.6; 224/403; 224/404
(58) Field of Classification Search ........... 296/37.6, 296/3, 37.1; 224/404, 403, 511, 517, 535, 224/315, 319, 326; 312/293.2, 293.3
See application file for complete search history.

(56) References Cited

U.S. PATENT DOCUMENTS

| | | | | |
|---|---|---|---|---|
| 4,570,986 A * | 2/1986 | Sams | ............ | 293/117 |
| 4,705,317 A * | 11/1987 | Henri | ............ | 296/37.6 |
| 4,770,330 A * | 9/1988 | Bonstead et al. | ........... | 224/404 |
| 5,088,636 A * | 2/1992 | Barajas | ............ | 224/281 |
| 5,366,124 A * | 11/1994 | Dearborn, IV | ........... | 224/542 |
| 5,848,744 A * | 12/1998 | Dischner et al. | ........... | 224/404 |
| 5,899,544 A * | 5/1999 | James et al. | ........... | 312/198 |
| 5,947,356 A * | 9/1999 | Delong | ............ | 224/404 |
| 5,979,725 A * | 11/1999 | Lehrman | ............ | 224/539 |
| 5,988,473 A * | 11/1999 | Hagan et al. | ........... | 224/404 |
| 6,006,971 A | 12/1999 | Coleman | | |
| 6,007,129 A | 12/1999 | Kearney, Jr. | | |
| 6,308,873 B1 | 10/2001 | Baldas | | |
| 6,328,365 B1 | 12/2001 | Adsit | | |
| 6,422,629 B2 * | 7/2002 | Lance et al. | ........... | 296/37.6 |
| 6,464,277 B2 | 10/2002 | Wilding | | |
| 6,474,521 B1 * | 11/2002 | Young | ............ | 224/404 |
| 6,507,701 B2 | 1/2003 | Lake | | |
| 6,634,691 B2 * | 10/2003 | Henderson | ........... | 296/37.6 |
| 6,641,236 B2 * | 11/2003 | Grudzien | ........... | 312/216 |
| 6,913,304 B1 * | 7/2005 | Sweet | ............ | 296/37.6 |
| 6,923,354 B2 | 8/2005 | Axelson | | |
| 6,929,303 B1 * | 8/2005 | Sharples | ........... | 296/37.6 |
| 6,935,670 B2 * | 8/2005 | Bright | ............ | 296/37.6 |
| 7,055,724 B2 * | 6/2006 | Farentinos | ........... | 224/404 |
| 7,097,224 B2 * | 8/2006 | Lester et al. | ........... | 296/37.14 |
| 7,128,356 B2 | 10/2006 | Bassett | | |
| 2006/0244279 A1* | 11/2006 | Ranka et al. | ........... | 296/37.6 |
| 2006/0279099 A1* | 12/2006 | Ranka et al. | ........... | 296/37.6 |

\* cited by examiner

*Primary Examiner*—Jason S Morrow
(74) *Attorney, Agent, or Firm*—Lesavich High-Tech Law Group, P.C.; Stephen Lesavich

(57) ABSTRACT

Truck bed tool box. The truck bed tool box includes a tool box holder attachable to a bed of a truck and plural removable tool boxes that fit securely into the tool box holder. The tool box holder includes security mechanism to keep the plural removable tool boxes safe from theft and prevent them from moving around the truck bed.

15 Claims, 2 Drawing Sheets

TRUCKBED TOOLBOX

CROSS REFERENCES TO RELATED APPLICATIONS

This application claims priority to U.S. Provisional Patent Application 60/736,512, filed Nov. 14, 2005, the contents of which are incorporated herein by reference.

FIELD OF THE INVENTION

This invention relates to tool boxes. More specifically, it relates to a truck bed tool box.

BACKGROUND OF THE INVENTION

There are many types of tool boxes. These tool boxes are often placed in pick-up or other trucks with open beds. Such tool boxes are exposed to the weather and are subject to theft and loss. Such tool boxes are also not secured and often slide around the bed of the truck, causing damage to the toolbox and the interior of the bed of the truck. In addition, carpenters, mechanics and other professionals often have many different types toolboxes with many different types of tools that are commonly used for various jobs.

There have been attempts to solve some of the problems associated with truck bed tool boxes. For example, U.S. Pat. No. 6,006,971, entitled "Truckbed toolbox system," that issued to Coleman, et al., teaches "Provided herein is a toolbox system especially well suited for use on pickup trucks. The system provides quick and easy access to a wide variety of tools which may be contained in the toolboxes. The assemblies are modular and are readily loaded and unloaded from the bed portion of a pickup truck. An increased degree of safety and convenience is realized from use of the devices herein set forth."

U.S. Pat. No. 6,007,129, "Long handled tool holder," that issued to Kearney, teaches "an apparatus for holding and restraining long handled tools is described. The tool box is comprised of a top wall, two side walls and a bottom wall within which separate compartments are formed by slidable shelves. The shelves may further compartmentalize the enclosed areas by having partitioning walls to subdivide longitudinal sections. The shelves are supported by brackets and the entire tool box rests within the bed of a truck. The tool holder is retained within the bed of the truck by attaching bolts which extend outward from the truck side wall and through the side wall of the tool box. The tool box may also rest upon the wheel well of the truck in the truck bed to provide further support."

U.S. Pat. No. 6,328,365, entitled "Integrated bed drawer assembly for vehicles," that issued to Adsit teaches "An integrated bed drawer assembly is provided for a vehicle having a bed with a floor and sides extending upwardly and along the sides. The integrated bed drawer assembly includes a plurality of rails adapted to be spaced longitudinally and extend laterally between the sides above the floor of the bed. The integrated bed drawer assembly also includes a drawer operatively cooperating with the rails for sliding movement therealong.

U.S. Pat. No. 6,923,354 entitled "Tailgate toolbox," that issued to Axelson teaches "A toolbox assembly for mounting in the box of a pickup truck includes a rectangular casing with an open front end; a drawer slidable in said casing; a lock on said drawer for locking the drawer in the casing; a pair of L-shaped brackets for mounting on the floor of the box immediately rearwardly of the wheel wells, the brackets slidably receiving the casing; and a lock mechanism for releasably locking the casing in said brackets.

However, none of these solutions solves all of the problems associated with truck bed tool boxes. Thus, it is desirable to provide truck bed tool boxes.

SUMMARY OF THE INVENTION

In accordance with preferred embodiments of the present invention, some of the problems associated with truck bed tool boxes are overcome. A truck bed tool box is presented.

The truck bed tool box includes a tool box holder attachable to a bed of a truck and plural removable tool boxes that fit securely into the tool box holder. The tool box holder includes security mechanism to keep the plural removable tool boxes safe from theft and prevent them from moving around the truck bed.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
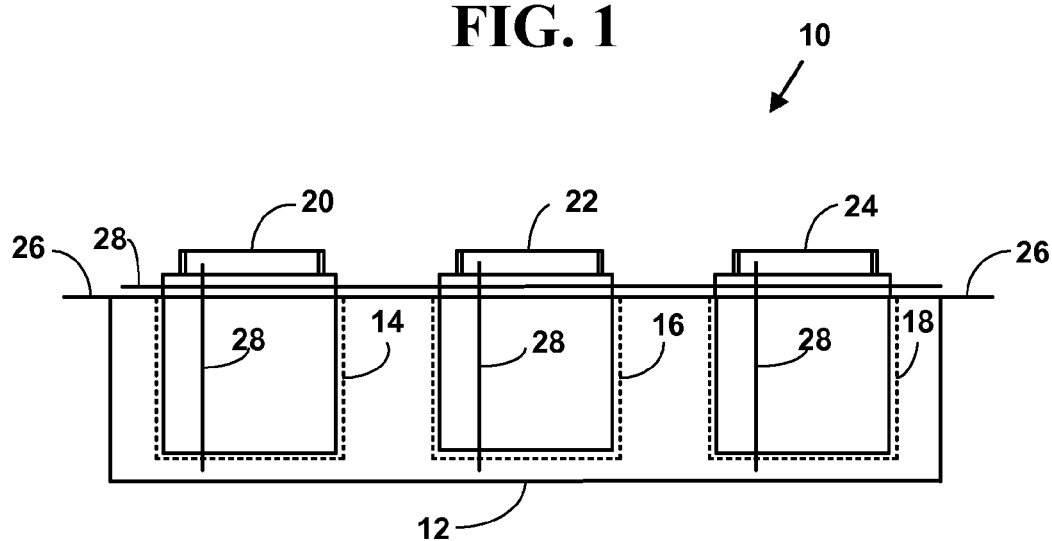
FIG. 1 is a block diagram illustrating a side view of a truck box tool box.

FIG. 1 is a block diagram illustrating a side view 10 of a truck bed tool box. The truck bed tool box includes a tool box holder 12 with plural openings 14, 16, 18, for attaching plural removable toolboxes 20, 22, 24 (only three of which are illustrated). The truck box holder 12 includes plural truck box attachment means 26 (two or which are illustrated) that are used to attach the tool box holder 12 to a truck bed.

In one embodiment, the plural openings 14, 16, 18 in the tool box holder 12 include plural openings specifically sized and shaped for large, medium, or small removable toolboxes or any combination thereof. The plural openings 14, 16, 18 can be the same size or different sizes to accommodate removable toolboxes of different sizes.

For example, a carpenter may have a large rectangular toolbox including general tools, and a small square tool box for a saw and a medium size rectangular toolbox for a nailing tool, etc. The plural openings 14, 16, 18 would be specifically sized and shaped to accommodate such toolboxes. However, the present invention is not limited to such an embodiment and other sized and shape openings can also be used to practice the invention FIG. 1 illustrates rectangular toolboxes openings. However, the present invention is not limited to such an embodiment and toolboxes of other shapes, such as square, trapezoidal, oval, round, etc. can also be used to practice the invention.

In one embodiment, the plural removable toolboxes 20, 22, 24, extend above the tool box holder 12 (e.g., illustrated in FIG. 1). In another embodiment, the plural removable toolboxes 20, 22, 24, do not extend above the tool box holder 12 and are flush (i.e., even) with the top of the tool box holder 12.

In one embodiment, the tool box holder 12 is attached to a bed of a truck nearest the truck cab. In another embodiment, the tool box holder is attached to a bed of a truck at an end nearest the truck tailgate. However, the present invention is not limited to such an embodiment and the tool box holder 12 can be attached in other positions in a truck bed.

In one embodiment, the plural removable toolboxes 20, 22, 24 include one or more openings through which a security means 28 (e.g., a rod, pole, cable, etc. to which a lock or other security device can be attached) passes through to secure the plural removable toolboxes 20, 22, 24 to the tool box holder 12.

In one embodiment, the plural toolboxes 20, 22, 24 includes at least two openings (e.g., one on a left side and one on a right side) in a top portion of the toolboxes that extend above the tool box holder 12 (illustrated in FIG. 2) through which the security means 28 passes through horizontally. In another embodiment, the plural toolboxes 20, 22, 24 include at least two openings in a bottom portion of the toolboxes. In such an embodiment, the security means 28 horizontally extends through a portion of the truck bed and the tool box holder 12. A lock is attached to one or both ends of the horizontal security means 28.

In another embodiment, the plural toolboxes 20, 22, 24 include a first opening in a top portion of the toolbox and a second opening in a bottom portion of the plural toolboxes 20, 22, 24. In such an embodiment, two security means 28 are used, both passing through horizontally passing the first opening and second openings. A lock is attached to one or both ends of the vertical security means 28.

In another embodiment the security means 28 does not extend through a portion of the truck bed, but extends only through the tool box holder 12. In another embodiment, the security means 28 is included in a top portion of the plural toolboxes 20, 22, 24. In such an embodiment, separate security means 28 attaches through the top portion of the plural toolboxes 20, 22, 24, vertically into the tool box holder 12.

In another embodiment the plural toolboxes 20, 22, 24 each include one opening in which a lock or other security means is placed to lock the toolboxes to the tool box holder 12 (e.g., through a front of the tool box holder 12 and the front of the plural toolboxes 20, 22, 24). Other various types of security mechanisms can also be used. Each of the plural toolboxes 20, 22, 24, also has its own lock or other security mechanism to lock the top of the toolboxes to prevent opening while stored in the tool box holder.

Figure 2:
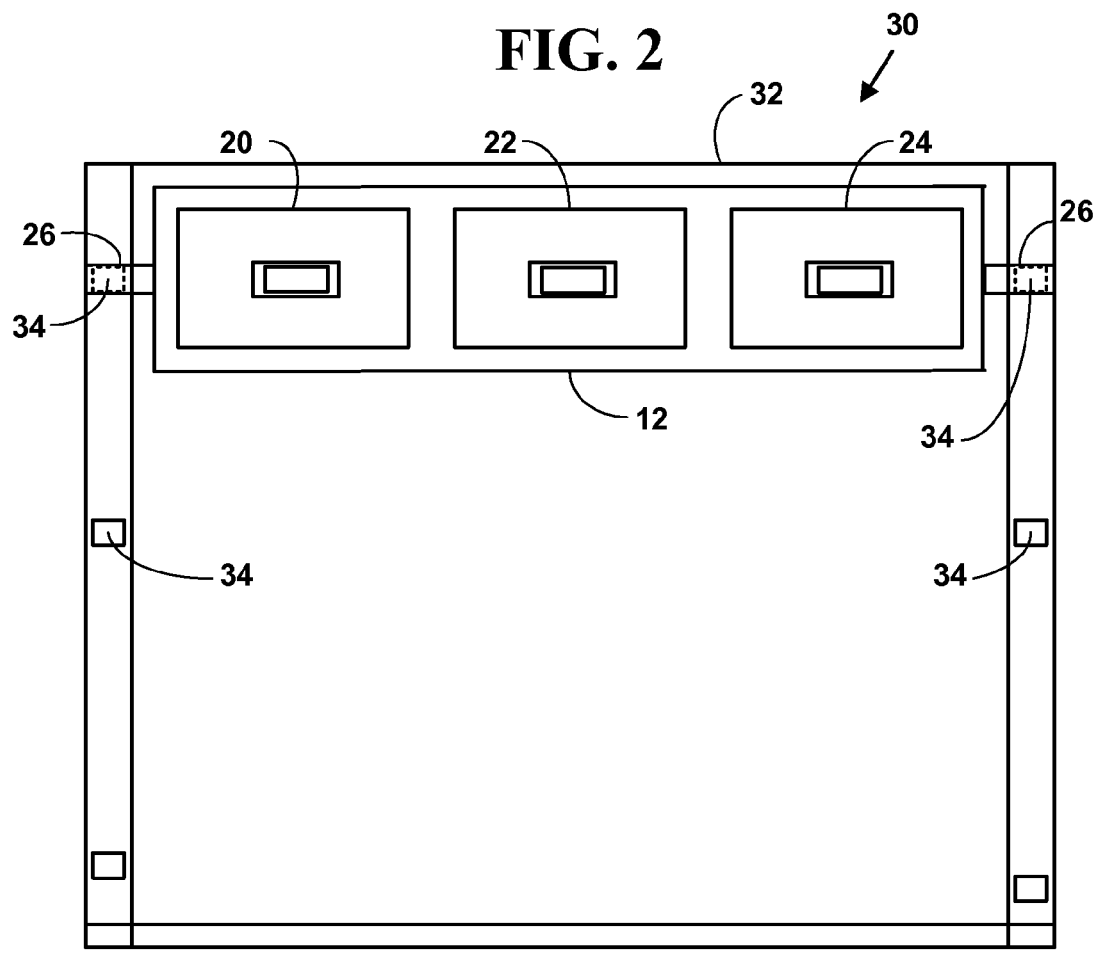
FIG. 2 is a block diagram illustrating a top view of truck box tool box.

FIG. 2 is a block diagram illustrating a top view 30 of the truck box tool box in an open truck bed 32 with pre-existing pocket holes 34 in truck bed rails.

Figure 3:
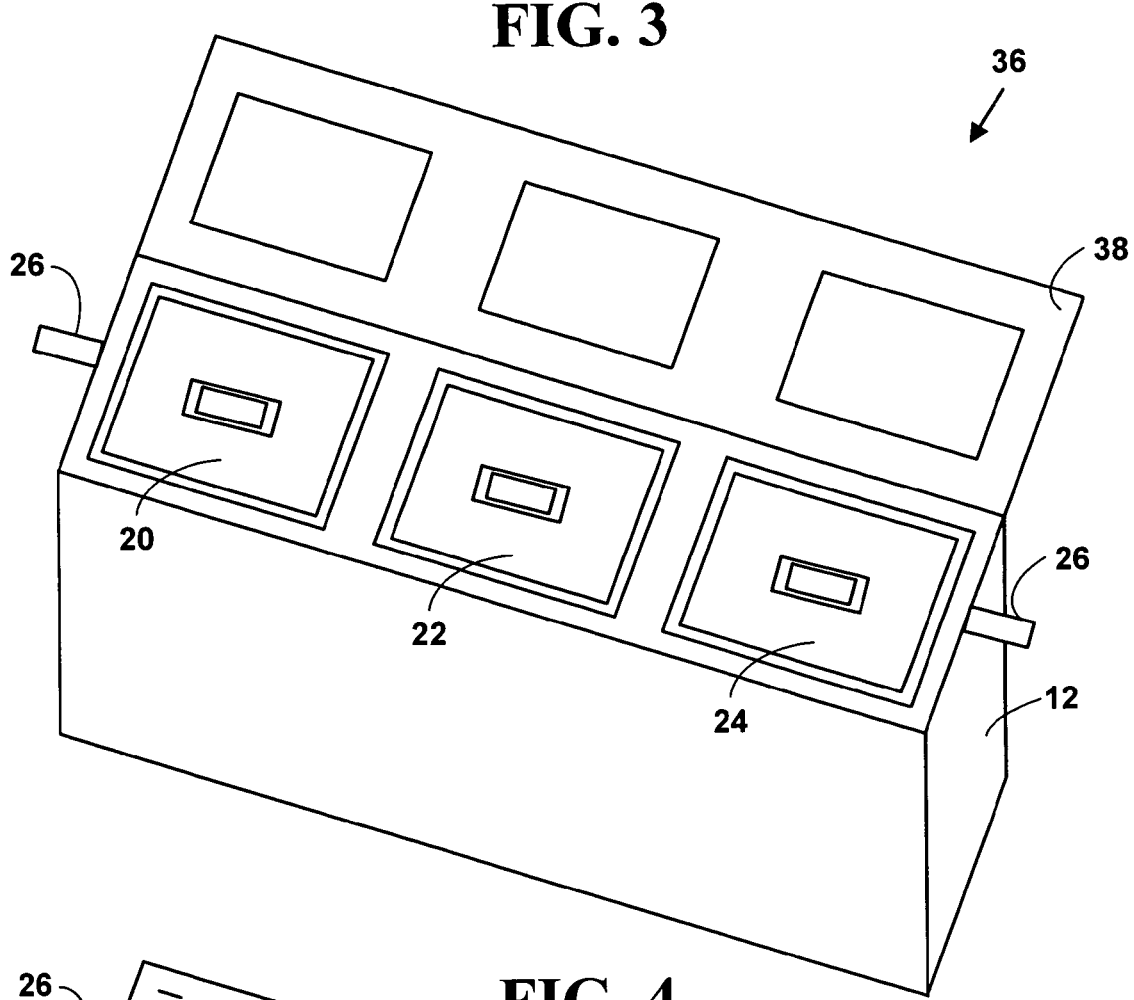
FIG. 3 is a block diagram illustrating a perspective view of the truck tool box including a security door in an open position.

FIG. 3 is a block diagram illustrating a perspective view 36 of the truck tool box 12 including a security door 38 in an open position.

Figure 4:
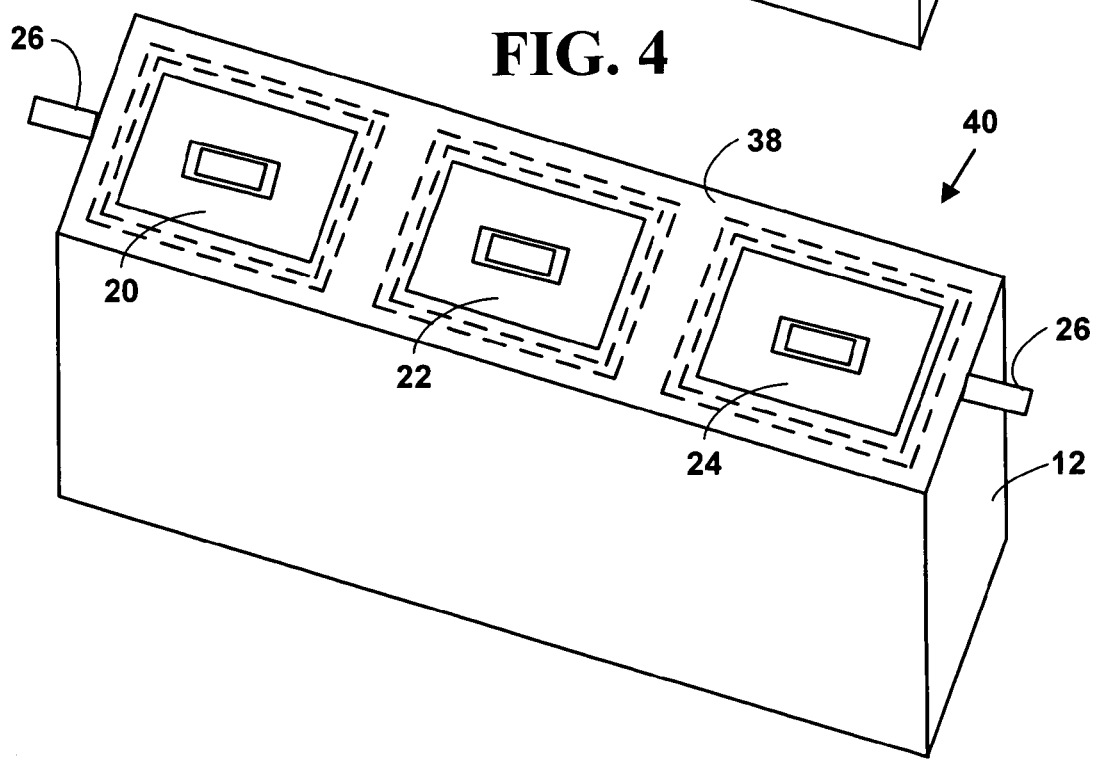
FIG. 4 is a block diagram illustrating a perspective view of the truck tool box including a security door in a closed position.

FIG. 4 is a block diagram illustrating a perspective view 40 of the truck tool box 12 including a security door 38 in a closed position.

In another embodiment the security means 28 includes a security door 38 (FIGS. 3, 4) that when closed engages the tops of the plural toolboxes 20, 22, 24 to prevent unauthorized removal. When the security door 38 is open, the security door 38 does not engage the plural toolboxes 20, 22, 24 and the plural toolboxes 20, 22, 24 can be removed. In another embodiment the security door 38 includes security strips.

The security door 38 comprises, metal, plastic, composite materials or other security and weatherproof material to prevent unauthorized removal of the plural toolboxes 20, 22, 24. However, the present invention is not limited to such an embodiment and other embodiments can also be used to practice the invention.

In one embodiment, the truck bed attachment means 26 includes a flap or flange to attach the tool box holder to the bed of a truck. In one embodiment, the flap or flange includes metal, plastic, composite materials, or other durable materials that prevent unauthorized removal. However, the present invention is not limited to such an embodiment and other embodiments can also be used to practice the invention.

In one embodiment, the truck bed attachment means 26 is specifically sized and shaped and includes brackets to securely attach to pre-existing openings (e.g., pocket holes, etc.) in the truck bed rails. In such an embodiment, the pre-existing openings are provided by the truck manufacturer in the truck bed rails when the truck is manufactured. Such pre-existing openings are provided in most every truck bed by most every truck manufacturer. In another embodiment, the truck bed attachment means 26 include brackets to attach the flap or flange of the tool box holder directly to the truck bed 32.

In one embodiment, a top portion of each of the plural removable toolboxes 20, 22, 24, includes a weatherproof material such as rubber, plastic, composite materials, etc. that are resistant to weather and can be stored in truck bed exposed to weather. In such an embodiment, a bottom portion of the plural removable toolboxes includes metal, composite materials, wood, or other materials. In another embodiment, each of the plural removable toolboxes 20, 22, 24 are made entirely out of the weatherproof material.

The present invention allows plural toolboxes with plural different types of tools to be selectively and securely removed and stored in an open truck bed while being protected from the weather and from theft. The present invention, thus allows the plural toolboxes 20, 22, 24 in the tool box holder 12 to be stored in a truck with an open bed to be securely left on a street, on a job site, etc.

It should be understood that the processes, methods and system described herein are not related or limited to any particular type of component unless indicated otherwise. Various combinations of general purpose, specialized or equivalent components combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer or equivalent elements may be used in the block diagrams.

The claims should not be read as limited to the elements described unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A truck bed tool box holder, comprising in combination:
 a plurality of removable toolboxes securely attachable to a tool box holder means, wherein the plurality of removable toolboxes are commonly available toolboxes of existing sizes and shapes;

a tool box holder means with a plurality of openings for attaching the plurality of removable toolboxes, wherein the plurality of openings are specifically sized and shaped to receive the plurality of removable toolboxes that are commonly available toolboxes of existing sizes and shapes and wherein the plurality of removable toolboxes extend above a top surface the tool box holder means;

a truck bed attachment means to attach the tool box holder means to a truck bed, wherein the truck bed attachment means attaches to pre-existing openings in a top portion of rails of the truck bed created during manufacture of the truck bed; and a security door means to securely attach the plurality of removable toolboxes to the toolbox holder means and prevent unauthorized removal of the plurality of removable toolboxes from the tool box holder means, wherein the security door means includes a plurality of openings in alignment with the plurality of openings in the tool box holder means for protecting the plurality of removable toolboxes, wherein the plurality of openings in the security door means are smaller in size than the plurality of openings in the tool box holder means to prevent unauthorized removal of the plurality of toolboxes and wherein the security door means when closed engages a portion of the tops of the plurality of removable toolboxes that extend above a top surface of the tool box holder means to prevent unauthorized removal from the tool box holder means; and a security means to further securely attach the plurality of removable toolboxes to the toolbox holder means and prevent unauthorized removal of the plurality of removable toolboxes from the tool box holder means, wherein the security means includes a rod, cable or pole with one or more locks.

2. The truck bed tool box holder of claim 1 wherein the plurality of openings include a plurality of square, rectangular, trapezoid or oval openings or a combination thereof.

3. The truck bed tool box holder of claim 1 wherein the plurality of openings are specifically sized and shaped for existing and commonly available large, medium or small removable toolboxes or a combination thereof.

4. The truck bed tool box holder of claim 1 wherein the security means further includes a horizontal security means that passes horizontally through the plurality of removable toolboxes to securely attach the plurality of removable toolboxes to the tool box holder means.

5. The truck bed tool box holder of claim 1 wherein the security means further includes a vertical security means that passes vertically through the plurality of removable toolboxes to securely attach the plurality of removable toolboxes to the tool box holder means.

6. The truck bed tool box holder of claim 1 wherein a top portion of plurality of removable toolboxes exposed via the tool box holder means comprise a weatherproof material.

7. The truck bed tool box holder of claim 1 wherein the plurality of removable toolboxes comprise a weatherproof material.

8. A truck bed tool box holder, comprising in combination:

a plurality of removable toolboxes securely attachable to a tool box holder attached to truck bed;

the tool box holder with a plurality of openings for securely attaching the plurality of removable toolboxes;

a plurality of truck bed attachments to attach the tool box holder to the truck bed; and a security door with a plurality of openings in alignment with the plurality of openings in the tool box holder for protecting the plurality of removable toolboxes and a security means to securely attach the plurality of removable toolboxes to the toolbox holder and further prevent unauthorized removal of the plurality of removable toolboxes from the tool box holder, wherein the plurality of openings in the security door are smaller in size than the plurality of openings in the tool box holder to prevent unauthorized removal of the plurality of toolboxes and wherein the security door when closed engages a portion of the tops of the plurality of removable toolboxes that extend above a top surface of the tool box holder to prevent unauthorized removal from the tool box holder.

9. The truck bed tool box holder of claim 8 wherein the plurality of removable toolboxes are commonly available toolboxes of existing sizes and shapes.

10. The truck bed tool box holder of claim 8 wherein the security attachment includes a horizontal security attachment that passes horizontally through the one or more openings in the plurality of removable toolboxes to securely attach the plurality of removable toolboxes to the tool box holder.

11. The truck bed tool box holder of claim 8 wherein the security attachment includes a vertical security attachment that passes vertically through the one or more openings of plurality of removable toolboxes to securely attach the plurality of removable toolboxes to the tool box holder.

12. The truck bed tool box holder of claim 8 wherein the security attachment includes a rod, cable, pole with one or more locks.

13. The truck bed tool box holder of claim 8 wherein a top portion of plurality of removable toolboxes exposed via the tool box holder means comprise a weatherproof material.

14. The truck bed tool box holder of claim 8 wherein the plurality of removable toolboxes comprise a weatherproof material.

15. The truck bed tool box holder of claim 8 wherein the plurality of truck bed attachments attach to pre-existing openings in a top portion of side rails of the truck bed.

* * * * *